United States Patent
Murcia (10) Patent No.: US 12,118,275 B2
(45) Date of Patent: Oct. 15, 2024

(54) METHOD FOR DETERMINING A WIND TURBINE LAYOUT

(71) Applicant: VESTAS WIND SYSTEMS A/S, Aarhus N (DK)

(72) Inventor: Juan Pablo Murcia, Frederiksberg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 805 days.

(21) Appl. No.: 17/270,355

(22) PCT Filed: Aug. 8, 2019

(86) PCT No.: PCT/DK2019/050240
§ 371 (c)(1),
(2) Date: Feb. 22, 2021

(87) PCT Pub. No.: WO2020/038536
PCT Pub. Date: Feb. 27, 2020

(65) Prior Publication Data
US 2021/0312101 A1    Oct. 7, 2021

(30) Foreign Application Priority Data
Aug. 20, 2018   (DK) .......................... PA 2018 70535

(51) Int. Cl.
*G06F 30/13*     (2020.01)
*F03D 80/00*     (2016.01)
(Continued)

(52) U.S. Cl.
CPC ............. *G06F 30/13* (2020.01); *F03D 80/00* (2016.05); *F05B 2260/84* (2013.01);
(Continued)

(58) Field of Classification Search
CPC .. G06F 30/13; G06F 2111/04; G06F 2113/06; G06F 3111/08; F03D 80/00; F05B 2260/84
See application file for complete search history.

(56) References Cited

U.S. PATENT DOCUMENTS

| 8,050,899 B2 | 11/2011 | Giguere et al. |
| 2009/0295165 A1* | 12/2009 | Giguere ................. G06Q 10/06 290/55 |

(Continued)

FOREIGN PATENT DOCUMENTS

| JP | 2000145614 A | 5/2000 |
| WO | 2020038536 A1 | 2/2020 |

OTHER PUBLICATIONS

González JS, Rodriguez AG, Mora JC, Santos JR, Payan MB. Optimization of wind farm turbines layout using an evolutive algorithm. Renewable energy. Aug. 1, 2010;35(8):1671-81. (Year: 2010).*

(Continued)

*Primary Examiner* — Chuen-Meei Gan
(74) *Attorney, Agent, or Firm* — Patterson + Sheridan, LLP (57) ABSTRACT

The invention provides a method for determining a wind turbine layout in a wind power plant comprising a plurality of wind turbines. The method comprises the steps of generating a plurality of random layout candidates fulfilling a set of basic requirements, and then performing a pre screening process on each of the plurality of random layout candidates. Based on the pre-screening process, a subset of layout candidates is selected and detailed optimization is performed on the layout candidates of the selected subset of layout candidates. Based on the detailed optimization, an optimized layout for the wind power plant is selected among
(Continued)

the optimized layout candidates of the subset of layout candidates.

12 Claims, 7 Drawing Sheets

(51) Int. Cl.
    *G06F 111/04* (2020.01)
    *G06F 111/08* (2020.01)
    *G06F 113/06* (2020.01)

(52) U.S. Cl.
    CPC ....... *G06F 2111/04* (2020.01); *G06F 2111/08* (2020.01); *G06F 2113/06* (2020.01)

(56) References Cited

U.S. PATENT DOCUMENTS

| | | | | |
|---|---|---|---|---|
| 2010/0138201 | A1* | 6/2010 | Gundling | F03D 7/026 703/9 |
| 2010/0312594 | A1 | 12/2010 | Andersen et al. | |
| 2011/0208483 | A1* | 8/2011 | Dilkina | G06F 30/00 703/2 |
| 2012/0029824 | A1* | 2/2012 | Wilson | G01W 1/10 702/3 |
| 2014/0039843 | A1 | 2/2014 | Hazra et al. | |
| 2014/0107985 | A1* | 4/2014 | Dilkina | G06Q 10/04 703/1 |
| 2016/0171401 | A1* | 6/2016 | Wu | G06Q 10/06315 705/7.22 |
| 2020/0311835 | A1* | 10/2020 | Zeng | G06Q 10/063 |

OTHER PUBLICATIONS

Danish Patent and Trademark Office 1st Technical Examination for Application No. PA 2018 70535 dated Mar. 4, 2019.
Feng Ju et al. Solving the wind farm layout optimization problem using random search algorithm. Renewable Energy, Jun. 2015, Elsevier, Jun. 26, 2016, vol. 78, pp. 182-192.
PCT Notification of Transmittal of the International Search Report and the Written Opinion of the International Searching Authority, or the Declaration for Application No. PCT/DK2019/050240 dated Nov. 13, 2019.
Yin Wing et al., "DETC2012-71478 Wind Farm Layout Optimization Considering Energy Generation and Noise Propagation," Aug. 12, 2012, pp. 4-5.
European Patent Office, Communication pursuant to Article 94(3) EPC for Application 19 753 242.7-1002 dated Jun. 21, 2022.

* cited by examiner

METHOD FOR DETERMINING A WIND TURBINE LAYOUT

FIELD OF THE INVENTION

The present invention relates to a method for determining a wind turbine layout in a wind power plant comprising a plurality of wind turbines.

BACKGROUND OF THE INVENTION

Wind turbines as a part of a wind power plant are normally arranged at a site such that power provided by the wind power plant is maximized. For instance, the turbines are placed at locations with the highest wind. However, there are a number of other parameters which need to be fulfilled when arranging the turbines, such as noise constraints, height constraints, spacing constraints, cost, profit, etc. Therefore, modelling of the power plant is of a crucial importance as development of wind power plants is to a great extent dependent on that. The arrangement of the wind turbines have previously been performed manually but now it is typically performed by commercial software based on demanding numerical calculations which include the most of constraints and parameters relevant for the placement of the wind turbines.

In order to arrange the wind turbines within the site, software would typically start by placing wind turbines one by one and calculating influence of wind to each wind turbine, while taking the influence of one wind turbine to another into account. Therefore, such commercial software typically requires a long computational time and high computing power. Furthermore, the final layout of the wind power plant needs to be manually optimized as the wind turbines and the site may have some additional requirements. Therefore, there is a need for a method which will relax requirements on computing power and which will decrease computational time, providing a layout for the wind power plant which does not require additional optimization.

U.S. Pat. No. 8,050,899 B2 discloses a method for determining wind turbine location within a wind power plant. A wind turbine layout is first prepared and may be determined randomly or according to a predetermined pattern. The layout may be prepared based on location boundaries and wind data measured at the site. The layout may then be optimized based on wind conditions on the site.

DESCRIPTION OF THE INVENTION

It is an object of embodiments of the invention to provide an improved method for wind turbine layout determination and optimization.

It is a further object of embodiments of the invention to provide an efficient wind turbine layout determination method which requires a shorter computational time compared to currently available methods.

It is an even further object of embodiments of the invention to provide a wind turbine layout determination method which relaxes requirements on computing power compared to currently available methods.

According to a first aspect, the invention provides a method for determining a wind turbine layout in a wind power plant comprising a plurality of wind turbines, the method comprising the steps of:

generating a plurality of random layout candidates, each layout candidate fulfilling a set of basic requirements, performing a pre-screening process on each of the plurality of random layout candidates, the pre-screening process including general optimization of the layout candidates, based on the pre-screening process, selecting a subset of layout candidates, performing detailed optimization on the layout candidates of the selected subset of layout candidates, and based on the detailed optimization, selecting an optimized layout for the wind power plant among the optimized layout candidates of the subset of layout candidates.

Thus, according to the first aspect, the invention provides a method for determining a wind turbine layout of a wind power plant. In the present context, the term 'wind turbine layout' should be interpreted to mean a distribution of wind turbines on a wind power plant site. It is a particular arrangement of a plurality of wind turbines positioned at a wind power plant site which fulfils certain requirements related to the site. The wind power plant site may be located at basically any location, both on-shore and off-shore. The wind power plant comprises a plurality of wind turbines arranged at the site according to the layout. The process of determining a layout of a wind power plant is sometimes referred to as 'siting'.

According to the method, a plurality of random layout candidates is initially generated, each of the plurality of random layout candidates fulfilling a set of basic requirements. The plurality of layout candidates may be generated through a statistical randomization. The set of basic requirements may be parameters which may need to be fulfilled in order to have the wind power plant existing and operating. For example, two wind turbines have to be erected at a certain distance from each other in order to, e.g., mitigate wake effects between neighbouring wind turbines. Furthermore, the wind turbines should all be positioned within the boundaries of the site of the wind power plant, and no wind turbines should be positioned in exclusion zones within the site of the wind power plant. The wind turbines defined by the layout should provide a required total power production of the wind power plant and/or a required number of wind turbines should be included in the layout.

The basic requirements may be used as constraints for a wind turbine randomization. Depending on a number of basic requirements and the nature of each of the basic requirements, the number of random layout candidates may vary. One of the advantages of this step is the fact that randomization is performed automatically and within a short time while it does not require big computing power but it provides a plurality of layouts. The number of layout candidates at this point in the process may be very high, such as hundreds or even thousands of layout candidates. Performing detailed optimization on all of these layout candidates in order to select the best one would require vast amounts of time and computer power.

Therefore, once the plurality of random layout candidates has been generated, a pre-screening process is performed on each of the plurality of random layout candidates. The pre-screening process may relate to evaluation of the layout candidates and getting an insight of wind plant operation. The pre-screening may be performed by applying a physical model for, e.g., power estimation of each of the layout candidates. The pre-screening process includes general optimization of the layout candidates, which may simply relate to decreasing the number of the layout candidates. During the pre-screening it may be revealed that some of the layout candidates are not-workable solutions which are then disregarded as soon as they are identified. The pre-screening process may be a rough process, e.g. with a low number of iterative steps, and which can therefore be performed relatively fast and without requiring a lot of computer power.

The pre-screening process serves for selecting a subset of layout candidates which, e.g., provide the best characteristics among the plurality of random layout candidates. As mentioned above, the best characteristics may relate to estimated power produced by the wind power plant arranged in accordance to one of the layout candidates. The subset of layouts may comprise 5 to 10 layouts which will be further optimized, and which each provides a good starting point for further optimization. In other words, the method provides several layouts which may be used for the wind power plant. These layouts are generated in a short time period and without using a large computing power.

Next, detailed optimization of the selected subset of layout candidates is performed. The detailed optimization is performed on each layout of the selected subset of layout candidates. It should be noted that the detailed optimization is more detailed and more thorough than the pre-screening process, and more time and more computer power is therefore required for each of the layout candidates being processed. However, since the detailed optimization is only performed on the layout candidates which were selected based on the pre-screening process, only a very limited number of layout candidates is processed, and it is ensured that the layout candidates being processed are the most promising layout candidates. Thereby it is ensured that the time and computing power is only used on layout candidates with a high probability of success. Accordingly, the total time and computing power required in order to obtain the best layout are reduced.

In this step, a plurality of physical conditions may need to be fulfilled. In order to fulfil the plurality of physical conditions at least one wind turbine may need to be repositioned within the layout. Repositioning of the turbines will improve the layouts leading towards the optimal layout which will provide, e.g., a maximum possible power generation for the given site, e.g. by positioning more wind turbines at positions with high wind and/or by duly taking wake effects into account. During this step, the number of wind turbines within the wind power plant may change slightly, i.e., one or more wind turbines may be added or removed to achieve better performance. Whether the wind turbines are added or removed may depend on minimum spacing constrains which should not be violated during this step.

Based on the detailed optimization, an optimized layout for the wind power plant is selected among the optimized layout candidates of the subset of layout candidates. To select one layout from the subset, different criteria may be used. The layouts from the subset may be compared based on one or more different criteria and the best one may be selected. For instance, the optimized layout may relate to a layout optimized for maximum power production of the plant. Alternatively, it may relate to a layout optimized for minimum loads, maximum profit for power in a given market, or to a layout optimized for cost, etc.

Both computing time and computing power are mainly gained in the detailed optimization step of the method as it is performed only on a selected subset of the layout candidates which comprises reduced number of the candidates. The detailed optimization may require iterations, however, a number of iterations may not be large as the selected layouts are already optimized to some extent. Furthermore, pre-screening of the randomly generated layouts may require iterations. However, each iteration may contain only a few calculation steps further ensuring short computing time and small computing power. Therefore, the entire optimization of the wind power plant and obtaining the optimized and optimal layout is performed in a short time and with a small computing power.

The step of generating a plurality of random layout candidates may be performed by defining a probability density function (PDF) proportional to a mean wind speed at the wind power plant. This means that the PDF may have embedded wind conditions. The PDF may be a function of coordinates, i.e., PDF=PDF(x, y). The PDF may be defined over the wind power plant site as being proportional to the mean wind speed at each point of the site and with zero probability outside the site, or in regions in which the mean wind speed is lower than an admissible wind speed quantile and inside possible internal exclusion zones. To define the PDF, wind resource assessment may need to be performed. The wind resource assessment may be carried out by a wind measurement campaign at the site and by collecting a large quantity of wind data. The measured wind data may be obtained for a reference height where a wind turbine hub may be placed. Once the wind assessment is available, the PDF may be defined. Once the PDF is defined it may be sampled by any standard random number generator to generate a plurality of layout candidates. Using a relevant PDF for randomizing the wind turbines at the site is an easy approach to be chosen for generation of layout candidates. Furthermore, by using PDFs a number of wind turbines is optimized. Additionally, PDFs ensure that more wind turbines are placed in the locations with the best wind resources.

Alternatively or additionally, the step of generating a plurality of random layout candidates may be performed by means of rejection sampling. For instance, in each of the randomly generated layout candidates, each wind turbine may apply a radial force proportional to the PDF and proportional to the wind direction frequency to the nearest positions. Furthermore, the rejection sampling helps producing random samples which better follow the PDF and can be extended to avoid constrains such as minimum spacing and rejection zones.

The basic requirements may include boundaries of site, internal exclusion zones, variable minimal spacing between wind turbines according to wind speed and wind direction, wind resources, number of wind turbines to be installed at the site, and/or total nominal power to be generated by the wind power plant.

In the present context, the term 'site' relates to a geographical area where the wind power plant is to be erected. The boundaries of the site define the size of the site and limits over which wind turbines should not be erected. The boundaries of the site may be inner and outer boundaries. The inner boundaries may define internal exclusion zones. The boundaries of the site are needed for setting boundary conditions for generation of layout candidates by randomization.

Internal exclusion zones may relate to zones which are not favourable for wind turbine placement. Internal exclusion zones of an off-shore site may relate to fishing areas, marine navigation areas, areas with an extreme water depth, areas with environmental impacts, e.g., big waves, etc. Exclusion zones of an on-shore site may relate to areas with very weak or no wind, bird migration zones, areas with undesirable soil properties, or other geographical obstacles, such as lakes, trees, buildings, power cables, etc. Internal exclusion zones may additionally serve as the boundary conditions for generation of layout candidates by randomization. Furthermore, internal exclusion zones may relate to other power plants such as solar panels, batteries, etc. around which a wind power plant may be erected. By taking other power plants into account a hybrid siting is possible.

Variable minimal spacing between turbines may be one more basic requirement for the generation of random layouts. The minimal spacing may be governed by the type of the wind turbines, in particular by the rotor diameter of the wind turbines. Typically, spacing between two wind turbines is equal to three rotor diameters. Furthermore, the minimal spacing may depend on expected wind speed and wind direction at the site. Namely, the minimal spacing between the wind turbines may vary over the site, as the wind conditions change over the site, e.g. due to the topology of the site. Typically, the distance between turbines is larger in the most frequent averaged site wind directions. The most frequent averaged site wind directions may relate to the main wind direction at the site.

Wind resources may also be used as basic requirements for generation of the plurality of random layout candidates. By knowing the expected wind speed and/or wind direction at the site, the randomizer can place more wind turbines in regions with better mean wind speed and fewer turbines in regions with unfavourable wind. Thereby the total power production of the wind power plant can be optimized.

The number of wind turbines to be installed at the site may be set by a customer who is erecting the wind power plant, or it may be based on statistics from already existing wind turbines. The number of turbines may be of relevance for the optimization speed, as the method does not need to perform estimation of the number which would be suitable for the site. By knowing, e.g., the site boundaries and the number of the turbines, the layouts may be generated in a fast manner by a statistical randomizer. The number of the wind turbines may be changed during the optimization process, as one or more wind turbines may be removed or added as required. Namely, an optimum number of wind turbines for a particular site may be obtained through the optimization process. This number may then serve in later optimizations as a starting point.

Total nominal power to be generated by the wind power plant may also be one of the basic requirements for the randomization. In this case, the randomizer generating the layouts may include calculation of nominal power of the generated layout. If the calculated nominal power is not equal or larger than the required nominal power, the generated layout may be discarded already in this step.

The general optimization may include applying a simple physical model involving at least one parameter. Typically, the model will use one layout candidate as input and will provide an improved layout which, e.g., provides more power than the given input layout. The simple physical model involving at least one parameter may be a fast model which may evaluate more than one layout at the time. The at least one parameter may account for wake effects, wind resources, loads, etc. When wind turbines extract the energy from wind, the rotation of wind turbine rotor reduces the wind speed and disturbs the air flow behind it, this is known as 'wake effect' of the wind turbine. Because of this effect, the area behind the wind turbine experiences a modified wind flow both in terms of mean velocity and turbulence intensity. As this may not be included in the randomization, it is of relevance to check the influence of wind turbines on each other within the layout. The layout may further be affected by wind energy distribution and wind direction across the site. Even though, the wind resources may be included in the randomization process through the minimal spacing and internal exclusion zones, these still play an important role in wind plant operation. Therefore, having a physical model which applies the wind resources on the layout candidates may provide an estimate of power production of the power plant. By a physical model which takes loads incurred by the turbines into consideration, operation conditions of the power plant can be observed.

The pre-screening process may include a comparison of the layout candidates. Once the layout candidates are characterized through the physical model, they can be compared. If, e.g., the physical model provides a power generation estimate for each layout candidate, layout candidates with the highest estimated power generation will be considered as better random layout candidate than the other candidates with lower power generation. In another example, the physical model can provide with the cost per unit power and in this case the best candidates would be those with the lowest cost per unit power. In yet one example, the physical model may evaluate wake effects and the layout candidates with the lowest wake effects will have the best. Furthermore, a comparison may reveal which of the layout candidates are closest to an optimal layout, and which may therefore be considered as superior starting point for an actual optimization process.

The pre-screening process may include ranking the layout candidates, and the step of selecting a subset of layout candidates may comprise selecting the layout candidates with the best ranking. The ranking of the layout candidates may also be compared in order to select the best candidates. By ranking the plurality of randomly generated layout candidates, a large number of layouts which may not be promising can be discarded without spending time and computing power resources on their further optimization and several candidates with good ranking, i.e., good starting properties, can be kept for further optimization. Alternatively, the layout candidates may be compared among each other and the best candidates may be selected for further optimization.

The detailed optimization may include applying a detailed physical model, applying statistical modelling, and/or identifying wind turbines that violate minimal spacing. The detailed physical model may include options in relation to technical feasibility, overall capital cost and the predicted energy production of the power plant. The detailed physical model may also include all the parameters mentioned above in relation to the simple physical model. For instance, the detailed physical model may regroup the wind turbines in accordance with the wind resources and/or it may remove wind turbines exposed to the lowest mean wind speed. Detailed optimization may be cost oriented and it may lead to a change of the number of the wind turbines, i.e., one or more turbines may be added or removed.

The statistical modelling may involve statistical data from existing wind power plants, placement of the turbines therein, harvested power over years with an insight to wind forecast, etc. Based on these statistical data, the wind turbines of the layout may be repositioned accordingly. Alternatively, a PDF used for generation of random layout candidates may be modified such that it is zero in all the regions which violate minimum spacing.

The minimal spacing between wind turbines may be used as a boundary condition for randomization and may be based on, e.g., the rotor diameter of the wind turbines. However, the minimal spacing may further depend on wind resources and wake effects and therefore further consideration of spacing between the wind turbines may be required. If the optimization reveals that there are wind turbines which violate the minimal spacing, these wind turbines may either be repositioned or may be removed from the wind power plant. The minimal spacing may also be changed, i.e., reduced or increased, during the detailed optimization, based on other optimization parameters such as wake effects, loads, etc.

The detailed optimization improves each layout from the subset of layout candidates.

The step of performing detailed optimization may be performed iteratively. For instance, at least one wind turbine may be repositioned until free-wake type airflow behind the rotor of the wind turbine is achieved. In another example, during repositioning of one wind turbine based on wind resources, minimum spacing may be violated and therefore, further repositioning is required. In yet one example, after modifying PDF to be zero in all the regions that violate the minimum spacing, the remaining wind turbine positions can be iteratively sampled from the modified PDF. Iterations may be repeated until a particular requirement is fulfilled. That may be, e.g., power generated by the power plant with a particular layout, noise level, loads, etc.

The step of performing detailed optimization on the layout candidates of the selected subset of layout candidates may include repositioning of at least one wind turbine until it reaches equilibrium. Wake effects may be one of the main reasons for repositioning of the wind turbines. Wind conditions across the site of the wind power plant could be another. Each wind turbine may affect several surrounding wind turbines located downwind by changing the airflow in its wake. One layout candidate may reach equilibrium when all parameters which need to be taken into consideration are balanced, e.g., when the wind turbines are not influenced by rotation of other wind turbines. To reach the equilibrium, typically, spacing between wind turbines in the prevailing wind direction need to be increased compared to the minimum spacing to avoid wake effects. By repositioning the wind turbines until they reach equilibrium the available wind energy is exploited in the best way and energy loss from the wake effect is minimized.

The method may further comprise the step of performing a final optimization of the selected optimized layout for the wind power plant. Once the optimized layout is selected, further optimization may be performed based on, e.g., a particular model of wind turbines which are going to be used at the site, or based on the latest wind forecast. The final optimization step may further improve the operation of the wind power plant.

The method may further comprise the step of erecting a wind power plant in accordance with the selected optimized layout. When the layout is finally optimized, the next natural step is to erect the wind turbines at the site of the wind power plant in accordance with the optimized layout. The optimized layout comprises the boundaries of the site as well as the internal exclusion zones, and coordinates of each of the wind turbine in relation to the boundaries of the site ensuring straightforward application of the optimized layout at the site. Thereby it is ensured that the wind power plant which is eventually erected has its wind turbines located within the site in the manner prescribed by the selected optimal layout, and thereby the resulting wind power plant will be optimal in the sense of the applied optimization criteria, e.g. expected power production, loads or wear on the wind turbines, costs, profit, etc.

The method may further comprise the step of estimating power generated by the wind power plant with the optimized layout. Even though power generation may be estimated through the optimization process, a new estimate can be made after the final optimization step. As described above, in some cases the optimization procedure may not be based on power generation, but it may rather be focused on cost per unit power, load considerations, or similar. In these cases, estimation of power generated by the wind power plant may be a parameter of relevance when the power plant is connected to a power grid.

According to a second aspect, the invention provides a wind power plant comprising a plurality of wind turbines arranged at a site, wherein the plurality of wind turbines are arranged at the site according to a layout determined using the method according to the first aspect of the invention. The skilled person would therefore readily understand that any feature described in combination with the first aspect of the invention could also be combined with the second aspect of the invention, and vice versa. Accordingly, the remarks set forth above with reference to the first aspect of the invention are equally applicable here.

BRIEF DESCRIPTION OF THE DRAWINGS

The invention will now be described in further detail with reference to the accompanying drawings in which.

DETAILED DESCRIPTION OF THE INVENTION

Figure 1:
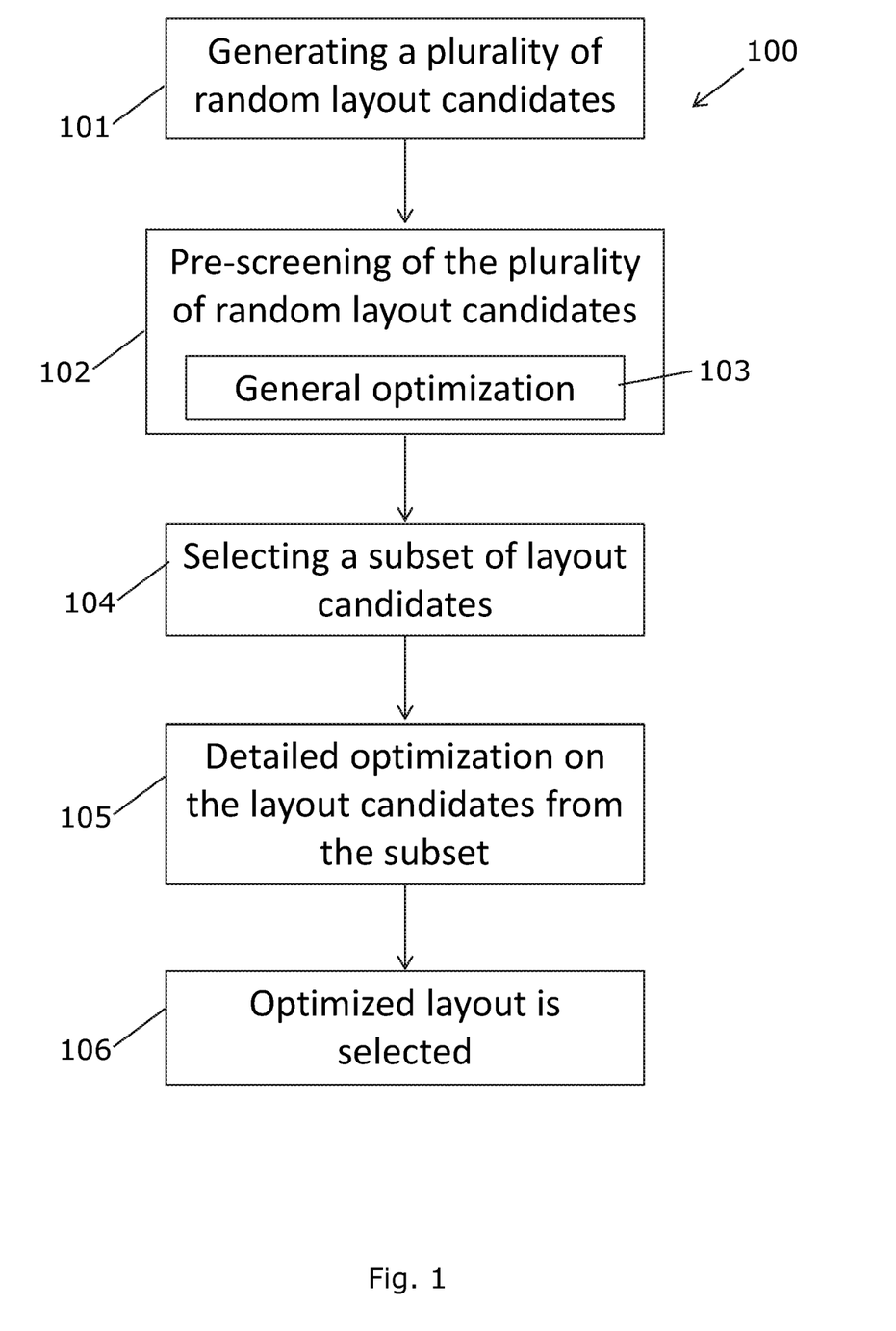
FIG. 1 shows a flow chart of a method for determining a wind turbine layout in a wind power plant comprising a plurality of wind turbines.

FIG. 1 shows a flow chart 100 of a method for determining a wind turbine layout of a wind power plant comprising a plurality of wind turbines. In the first step 101 a plurality of random layout candidates are generated. They may be generated through any standard statistical randomizer which includes certain boundaries as each layout candidate needs to fulfil a set of basic requirements. The set of basic requirements may include boundaries of site, internal exclusion zones, variable minimal spacing between turbines according to wind speed and wind direction, wind resources, number of wind turbines to be installed at the site, and/or total nominal power to be generated by the wind power plant. Random generation of the layouts is performed within a short time and it does not require large computing power.

Once the plurality of layout candidates is generated in the first step 101, a pre-screening process 102 is performed on each of the plurality of random layout candidates. The pre-screening process 102 includes general optimization of the layout candidates 103. In the pre-screening process 102 the layouts may be evaluated and further compared. General optimization 103 may, e.g., relate to decreasing the number of layout candidates as during pre-screening it may be revealed that some of the layout candidates are non-workable solutions which are then disregarded during the general optimization step 103.

Based on the pre-screening process 102, a subset of layout candidates is selected in the further step 104. If the layout candidates are compared in the pre-screening process 102, the best candidates may be selected for the subset. The selected layout candidates may be the most promising candidates for further optimization and which may not require large number of iterative optimization in order to achieve an optimal layout.

The step of detailed optimization 105 is further performed on each layout candidate of the selected subset of layout candidates. The detail optimization 105 may encounter for a plurality of physical conditions. In this step 105 at least one wind turbine may need to be repositioned within the layout. Optimization 105 of the layout candidates from the subset aims to generate a layout with the best possible performances. For instance, the detailed optimization 105 may improve the layouts in terms of maximum power generation, and/or for maximum profit for power in a given market, it may increase wind power plant's utilization rate, etc. This step 105 does not require large computing power and time as the detailed optimization 105 is performed only on a reduced number of layout candidates which already have decent characteristics, e.g., in terms of maximum power generation, etc.

Based on the detailed optimization 105, an optimized layout for the wind power plant is selected 106 among the optimized layout candidates of the subset of layout candidates. The selected layout candidate may have the best characteristic(s) among the all layout candidates from the subset, i.e., the selected layout may be the best in terms of minimum loads, maximum profit for power in a given market, the best in terms of cost, etc.

Figure 2:
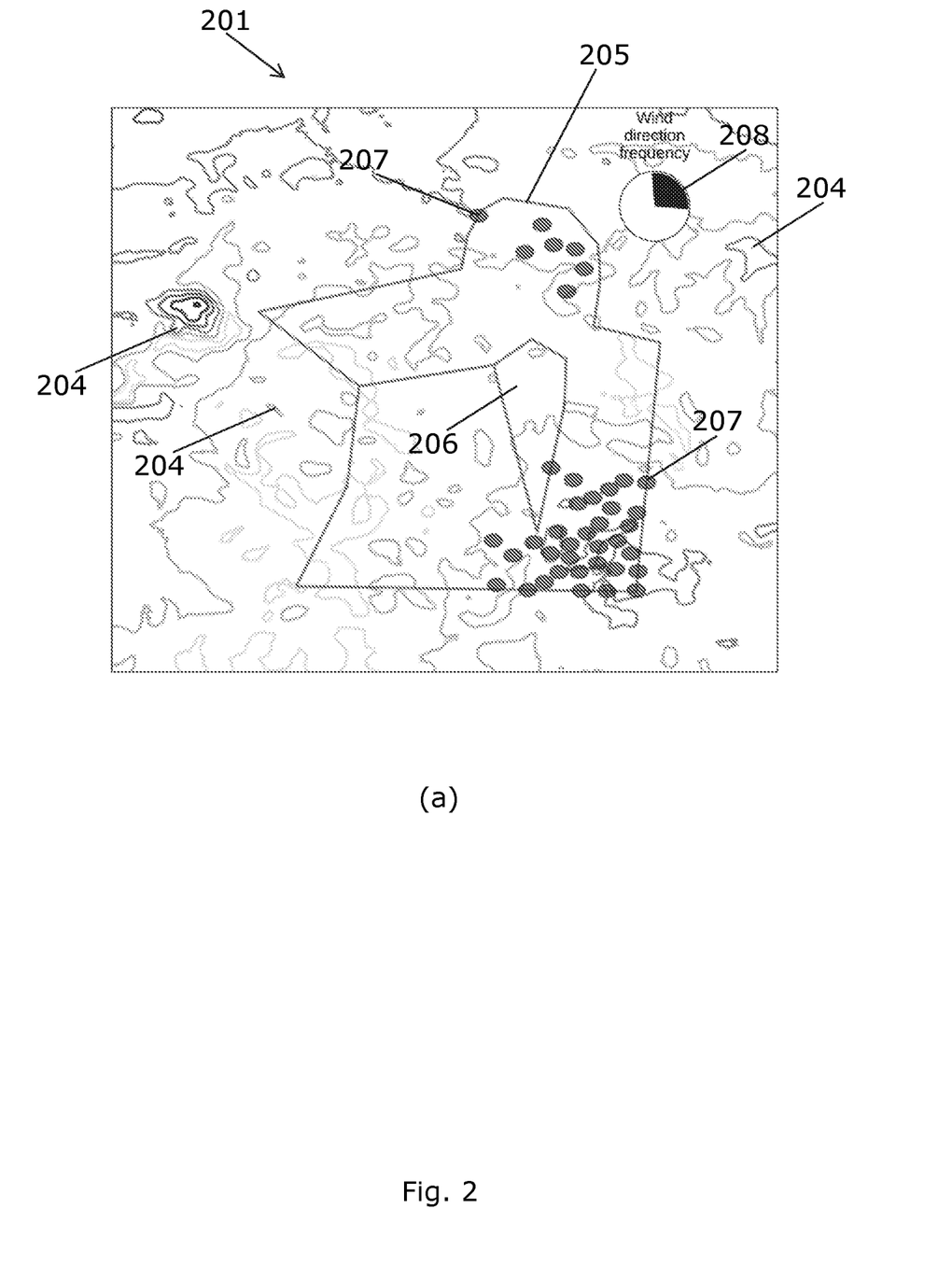
FIG. 2 illustrates two randomly generated layout candidates.

FIG. 2 illustrates three randomly generated layout candidates, 201-203. The layout candidates 201-203 may be generated by a randomizer. As an input, the randomizer may have wind resources map illustrated by a large number of contour lines 204 and a simplified wind rose 208, boundaries 205 defining a site, one exclusion zone 206, and a number of wind turbines available. The wind resources map 204 represents the energy carried by the wind and which may be based on at least one year of wind measurements in a region of the site. The wind rose 208 shows the frequency of winds blowing from particular directions over a specified period indicating the wind blowing in north east direction. In the initial step, a large number of layout candidates are generated and here only three of them are shown. Each layout candidate comprises 40 wind turbines 207 which are distributed in the best wind resources locations. Based on the wind rose 208, wind resources 204, boundaries 205 and the exclusion zone 206, the randomizer generates a plurality of layout candidates, three of which are shown in FIG. 2 (*a*)-(*c*). Each of the layout candidates 201-203 have different spacing between the turbines 207, defined by the randomizer. In the pre-screening process, the plurality of layout candidates are compared and/or ranked based on their characteristics. The layout candidate 202 shown in FIG. 2 (*b*) has the best expected production among the three shown layouts 201-203 and may be selected for further optimization. It should be noted that the layout candidates 201-203 are only an illustrative example. In a real case, the number of wind turbines may be larger, the wind rose may be more complex and the site may include more than one exclusion zone.

Figure 3:
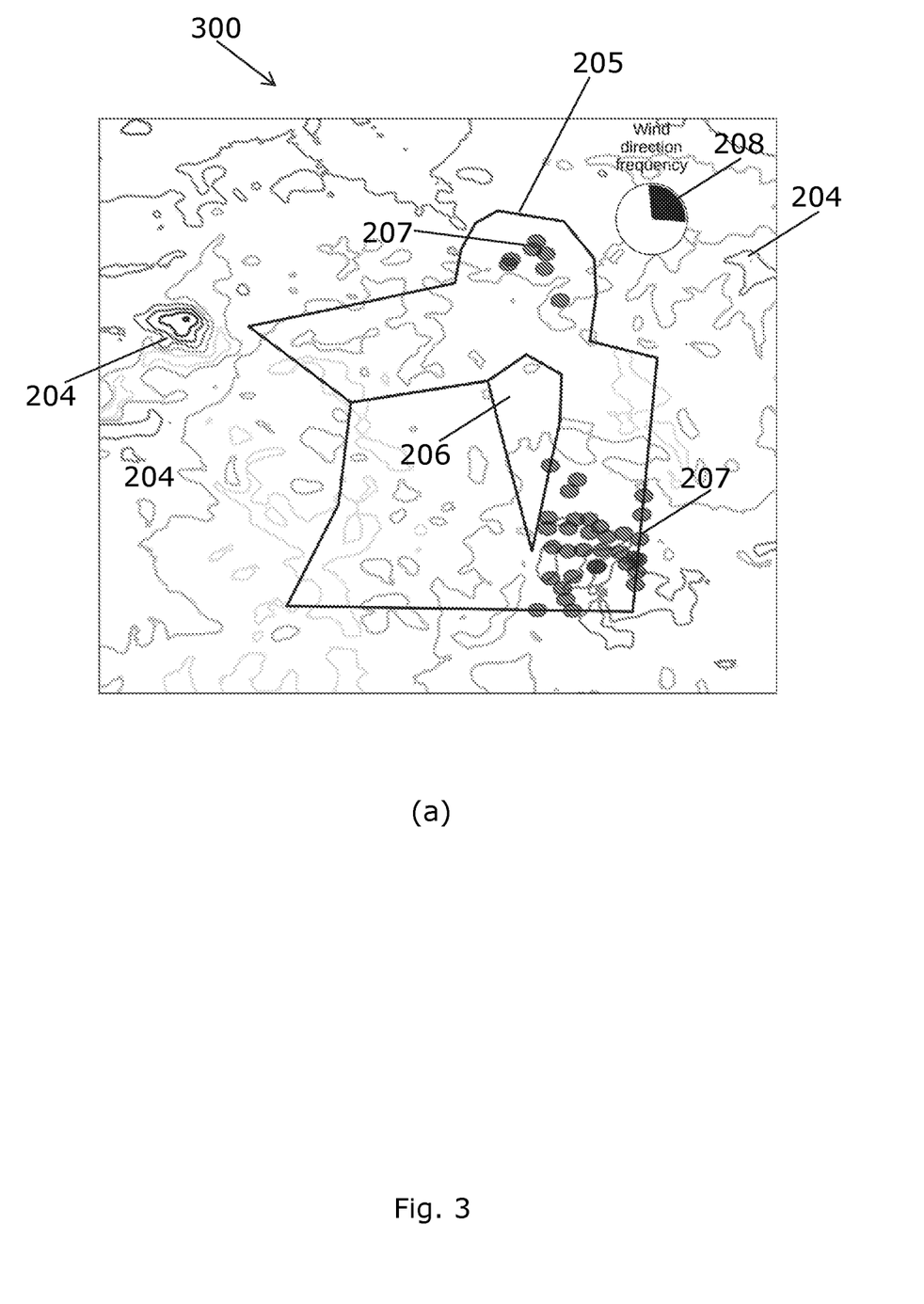
FIG. 3 illustrates optimization process of one randomly generated layout.

FIG. 3 illustrates optimization process of one randomly generated layout candidate 300. As in the previous FIG. 2, the layout candidate 300 is generated by the randomizer, based on the wind resources 204, boundaries of the site 205, one exclusion zone 206, 40 available wind turbines 207, and the simplified wind rose 208. The randomizer generates the layout candidate 300 shown in FIG. 3(*a*) in such a way that the predefined number of wind turbines 207 is distributed in areas with the most favourable wind, within the boundaries of the site 205 and outside the exclusion zone 206. Beside this particular layout candidate 300, a plurality of other random layout candidates are generates. Assuming that the layout candidate 300 is selected in the pre-screening, it will further be optimized. Further optimization may involve a number of iterative steps repositioning one by one wind turbine 207, or a group of wind turbines 207. Here, only two iterations are represented in FIG. 3 (*b*) and (*c*). From the FIG. 3(*a*) it can be seen that the wind turbines 207 are placed relatively close to each other and there is a possibility that the wind turbines 207 may influence each other's operation, i.e. wake effects may not be taken into account. FIG. 3(*b*) shows the layout candidate 300 after 100 iterations during which the majority of wind turbines 207 are repositioned and placed further apart to at least take wake effects into account. The final layout candidate 300 shown in FIG. 3(*c*) is a result of a further detailed optimization of the layout candidate 300 shown in FIG. 3(*b*). The number of the wind turbines 207 is maintained at 40 as the size of the site 205 is sufficient for 40 wind turbines 207. In another example, the number of the wind turbines may be changed. The optimization process of the layout candidate 300 is performed by optimizing total power generated by the wind power plant comprising 40 wind turbines 207. By comparing FIG. 3(*a*) and FIG. 3(*c*) it can be noticed that a general trend is that the wind turbines 207 are pushed away from each other and towards the site boundaries.

The invention claimed is:

1. A method for efficiently determining an optimized wind turbine layout in a wind power plant comprising a plurality of wind turbines, the method comprising:
   generating a first set of random layouts for the plurality of wind turbines in the wind power plant;
   calculating a nominal power for each of the first set of random layouts;
   removing, from the first set of random layouts, random layouts with a calculated nominal power less than a required nominal power to produce a second set of random layouts;
   performing a pre-screening process on each of the second set of random layouts to select, based on a comparison of a ranking of the second set of random layouts based on estimated power generation for the second set of random layouts with a threshold ranking, at least one random layout of the second set of random layouts, wherein the pre-screening process includes general optimization of the second set of random layouts;
   discarding the at least one random layout selected from the second set of random layouts to produce a third set of random layouts, wherein the third set of random layouts comprises fewer random layouts than the second set of random layouts;
   performing detailed optimization on the third set of random layouts to produce a plurality of optimized layouts; and
   based on the detailed optimization, selecting an optimized layout for operation of the wind power plant from amongst the plurality of optimized layouts based on power generation or loads of the plurality of optimized layouts.

2. The method of claim 1, wherein generating the first set of random layouts comprises defining a probability density function (PDF) proportional to a mean wind speed at the wind power plant.

3. The method of claim 1, wherein generating the first set of random layouts comprises rejection sampling.

4. The method of claim 1, wherein each of the first set of random layouts fulfils a set of basic requirements comprising at least boundaries of site, internal exclusion zones, variable minimal spacing between wind turbines according to wind speed and wind direction, wind resources, number of wind turbines to be installed at the site, or total nominal power to be generated by the wind power plant.

5. The method of claim 1, wherein the general optimization includes applying a physical model involving at least one parameter.

6. The method of claim 1, wherein the detailed optimization comprises at least applying a detailed physical model, applying statistical modelling, or identifying wind turbines that violate minimal spacing.

7. The method of claim 1, wherein the detailed optimization is performed iteratively.

8. The method of claim 1, wherein the detailed optimization comprises repositioning at least one wind turbine until the at least one wind turbine reaches equilibrium.

9. The method of claim 1, further comprising performing a final optimization of the selected optimized layout for the wind power plant.

10. The method of claim 1, further comprising erecting the wind power plant in accordance with the selected optimized layout.

11. The method of claim 1, further comprising estimating power generated by the wind power plant with the optimized layout.

12. A method for efficiently determining an optimized wind turbine layout in a wind power plant comprising a plurality of wind turbines, the method comprising:
   generating a first set of random layouts by defining a probability density function (PDF) proportional to a mean wind speed at the wind power plant, wherein each random layout of the first set of random layouts fulfils a set of basic requirements comprising at least:
      boundaries of site, internal exclusion zones, variable minimal spacing between wind turbines according to wind speed and wind direction, wind resources, number of wind turbines to be installed at the site, or total nominal power to be generated by the wind power plant;
   calculating a nominal power for each of the first set of random layouts;
   removing, from the first set of random layouts, random layouts with a calculated nominal power less than a required nominal power to produce a second set of random layouts;
   performing a pre-screening process on each of the second set of random layouts to select, based on a comparison of a ranking of the second set of random layouts based on estimated power generation for the second set of random layouts with a threshold ranking, at least one random layout of the second set of random layouts, wherein the pre-screening process includes general optimization of the second set of random layouts, wherein the general optimization includes applying a physical model involving at least one parameter;
   discarding the at least one random layout selected from the second set of random layouts to produce a third set of random layouts, wherein the third set of random layouts comprises fewer random layouts than the second set of random layouts;
   performing detailed optimization on the third set of random layouts to produce a plurality of optimized layouts; and
   based on the detailed optimization, selecting an optimized layout for operation of the wind power plant from amongst the plurality of optimized layouts based on power generation or loads of the plurality of optimized layouts.

* * * * *